US008413078B2

(12) United States Patent
Kim et al.

(10) Patent No.: US 8,413,078 B2
(45) Date of Patent: Apr. 2, 2013

(54) MOBILE TERMINAL FOR DISPLAYING HUMAN CONTACT DATA AND METHOD THEREOF

(75) Inventors: Jung Hun Kim, Busan (KR); Young Ho Rhee, Seoul (KR); Jae Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 650 days.

(21) Appl. No.: 12/061,133

(22) Filed: Apr. 2, 2008

(65) Prior Publication Data

US 2008/0263457 A1  Oct. 23, 2008

(30) Foreign Application Priority Data

Apr. 17, 2007 (KR) .................. 10-2007-0037435

(51) Int. Cl.
*G06F 3/14* (2006.01)
*G06F 3/048* (2006.01)

(52) U.S. Cl. ....................... 715/864; 715/764

(58) Field of Classification Search .......... 715/751, 715/764, 810, 811, 835, 864
See application file for complete search history.

(56) References Cited

U.S. PATENT DOCUMENTS

| 6,845,488 | B1 * | 1/2005 | Shim et al. ............. 715/815 |
| 7,375,730 | B2 * | 5/2008 | Tagliabue et al. ........ 345/581 |
| 7,685,530 | B2 * | 3/2010 | Sherrard et al. ......... 715/764 |
| 8,200,808 | B2 * | 6/2012 | Ishida .................... 709/224 |
| 2004/0017376 | A1 | 1/2004 | Tagliabue et al. |
| 2004/0056901 | A1 * | 3/2004 | March et al. ............ 345/811 |
| 2006/0141991 | A1 | 6/2006 | House et al. |
| 2007/0275766 | A1 | 11/2007 | Kim et al. |
| 2008/0256107 | A1 * | 10/2008 | Banga et al. ............ 707/102 |

FOREIGN PATENT DOCUMENTS

| EP | 1 860 852 | 11/2007 |
| JP | 2006-048698 | 2/2006 |
| JP | 2006-294024 | 10/2006 |
| KR | 1020020060373 | 7/2002 |
| KR | 1020020075646 | 10/2002 |
| KR | 1020060030422 | 4/2006 |
| KR | 100648899 | 11/2006 |
| WO | WO 2007/008321 | 1/2007 |

\* cited by examiner

*Primary Examiner* — Rashawn Tillery
(74) *Attorney, Agent, or Firm* — The Farrell Law Firm, P.C.

(57) ABSTRACT

A mobile terminal and a method of displaying human contact data are provided. Human contact data corresponding to a human contact event is created when a human contact event is generated. A name tag is displayed in a standby screen corresponding to the created human contact data. Accordingly, a user may easily identify human contact data through log data displayed in a user-oriented method.

15 Claims, 6 Drawing Sheets

MOBILE TERMINAL FOR DISPLAYING HUMAN CONTACT DATA AND METHOD THEREOF

PRIORITY

This application claims priority under 35 U.S.C. §119(a) to an application entitled "MOBILE TERMINAL FOR DISPLAYING HUMAN CONTACT DATA AND METHOD THEREOF" filed in the Korean Intellectual Property Office on Apr. 17, 2007 and assigned Serial No. 2007-0037435, the contents of which are incorporated herein by reference.

BACKGROUND OF THE INVENTION

1. Field of the Invention

The present invention relates generally to a method of displaying human contact data in a mobile terminal, and more particularly, to a method of displaying human contact data by using log data of a mobile terminal.

2. Description of the Related Art

With recent developments in mobile terminal technology, various functions are being added to mobile terminals for utilization by a user, such as wireless Internet, mobile multimedia broadcasting services, and photography, in addition to their basic function of voice communication. Various designs, sizes and user interfaces of mobile terminals are being developed.

Generally, a mobile terminal stores and displays a certain amount of log data for a predetermined period, such as a record of calls and messages transmitted or received. The log data is displayed as a list in order of log time point (i.e. the time at which the data was logged), and the most recent log data is displayed first. Accordingly, the user may identify a person most recently contacted and the type of communication through the log data.

However, in the prior art, the user may experience inconvenience in identifying how many persons were contacted and how many times each person was contacted. That is, the user may have difficulty in identifying the most frequently contacted person and the least frequently contacted person for a predetermined period.

SUMMARY OF THE INVENTION

The present invention has been made to address at least the above problems and/or disadvantages and to provide at least the advantages described below. Accordingly, an aspect of the present invention provides a mobile terminal and a method for displaying human contact data by using log data of the mobile terminal.

Another aspect of the present invention further provides a mobile terminal and a method for quickly identifying the most frequently contacted persons.

According to one aspect of the present invention, a method of displaying human contact data in a mobile terminal according to an embodiment of the present invention is provided. Human contact data corresponding to a human contact event is created, when the human contact event is generated. A name tag is displayed in a standby screen corresponding to the created human contact data.

According to another aspect of the present invention, a mobile terminal is provided. The mobile terminal includes a control unit for creating human contact data corresponding to a human contact event, when the human contact event is generated, and for creating a name tag corresponding to the created human contact data. The mobile terminal also includes a storage unit for storing the human contact data and the name tag created by the control unit. Finally, the mobile terminal includes a display unit for displaying the name tag created by the control unit.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Figure 1:
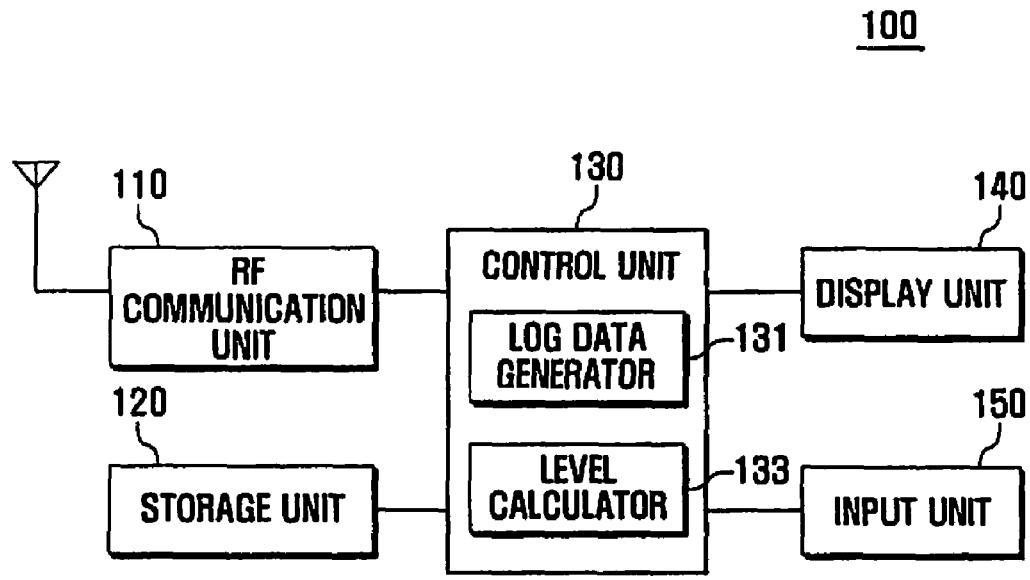
FIG. 1 is a block diagram showing a configuration of a mobile terminal according to an embodiment of the present invention.

Preferred embodiments of the present invention are described in detail with reference to the accompanying drawings. The same reference numbers are used throughout the drawings. Detailed descriptions of constructions or processes known in the art may be omitted to avoid obscuring the subject matter of the present invention.

In the following description of the present invention, mobile terminals may be information and telecommunication equipment such as a Personal Digital Assistant (PDA), a smart phone, an International Mobile Telecommunication 2000 (IMT 2000) terminal, a Wideband Code Division Multiple Access (WCDMA) terminal, and a Universal Mobile Telecommunication Service (UMTS) terminal.

"Human contact event" means an event generated by a mobile terminal that is related to a person. The event may include a communication function, camera function, or scheduling function. In this specification, the communication function is described as a typical example, and includes call transmission and reception, and message transmission and reception. The message may be a Short Message Service (SMS) message, a Multimedia Message Service (MMS) message, an e-mail, or an instant message. The MMS message may be a voice message, a character message, or an image message. The call may be voice telephony or video telephony.

"Log data" means data created by a human contact event. The log data includes a name of a contact person, a telephone number, a type of the human contact event, and a generation time point of the human contact event. The log data further includes the number of contact occurrences generated by individual contact persons. In this situation, a contact person means a counterpart with whom the user performs a human contact event through the mobile terminal.

"Human contact frequency" means the number of human contact events generated by the mobile terminal with a corresponding individual contact person.

"Log data list" includes the total number of human contact events generated by the mobile terminal with individual contact persons, such as, the number of call transmissions and receptions, the number of message transmissions and receptions, the number of multimedia message transmissions and receptions, and the number of data file (photograph, music, and voice files) exchanges with individual contact persons. If specific log data is selected, a user may identify detailed information of the specific log data.

"People cloud screen" displays human contact data in the mobile terminal according to the human contact frequency. The people cloud screen displays a contact person as an icon according to the human contact frequency calculated by analyzing the log data. Accordingly, the user may identify the most frequently contacted person and the least frequently contacted person for a predetermined period through the icon displayed in the people cloud screen. The people cloud screen may be displayed as a part of a standby screen, display screen of call log, and application program (for example, a diary), according to a user setting. The people cloud screen may be transmitted to a computer, and displayed in a screen of the computer. In this specification, the people cloud screen is displayed in a standby screen.

"Icon" means an image, character or symbol used in the people cloud screen. In this specification, the icon is referred to as a name tag. The name tag is displayed as a character string and may be a name or a nickname of a contact person stored in a telephone book. The name tag may be displayed in different sizes, colors, and background colors according to the human contact frequency.

FIG. 1 is a block diagram showing a configuration of a mobile terminal according to an embodiment of the present invention.

Referring to FIG. 1, a mobile terminal 100 includes a Radio Frequency (RF) communication unit 110, a storage unit 120, a control unit 130, a display unit 140, and an input unit 150.

The RF communication unit 110 performs communication between the mobile terminal 100 and another mobile terminal, and includes an RF transmitter for up-converting the frequency of a signal to be transmitted and amplifying the signal, and an RF receiver for low-noise amplifying a received signal and down-converting the frequency of the signal.

The storage unit 120 stores application programs required for operation of the mobile terminal 100, data created during the operation of the mobile terminal 100, and data received from another mobile terminal. In particular, the storage unit 120 stores log data of a communication event generated by the control unit 130, human contact data including a name tag and a group level corresponding to the log data, and name tag display data for displaying the name tag in different font sizes, font colors, and background colors.

The control unit 130 controls general operation of the mobile terminal 100, and includes a log data generator 131 and a level calculator 133. If a human contact event is generated, the log data generator 131 analyzes log data corresponding to the human contact event, as shown in Table 1, and stores the analyzed log data in the storage unit 120.

TABLE 1

| Name | Telephone number | Type of human contact event | Generation time point |
|---|---|---|---|
| Name 1 | 010-1111-1111 | Call reception | 2007-03-26 09:00 |
| Name 3 | 010-3333-3333 | Multimedia message reception | 2007-03-26 09:23 |
| Name 2 | 010-2222-2222 | Multimedia message transmission | 2007-03-26 09:25 |
| Name 1 | 010-1111-1111 | Call transmission | 2007-03-26 10:18 |
| Name 6 | 010-6666-6666 | Call reception | 2007-03-26 11:02 |
| Name 1 | 010-1111-1111 | Short message transmission | 2007-03-26 11:10 |
| Name 1 | 010-1111-1111 | Short message reception | 2007-03-26 11:16 |
| ... | ... | ... | ... |
| Name 4 | 010-4444-4444 | Multimedia message reception | 2007-03-26 23:45 |

If a human contact event is generated, the log data generator 131 creates log data by analyzing the type of the generated human contact event, generation time point of the human contact event, name of a contact person, and telephone number of the contact person. The log data may include data in a personal scheduler containing a schedule, calendar, address book, photograph, and voice and music data.

The log data generator 131 counts the frequency of contact occurrences generated by individual contact persons. According to a setting method, the human contact frequency may be counted for a predetermined period, or for each day.

The level calculator 133 calculates a group level based on the counted human contact frequency. When displaying a name tag, the control unit 130 may classify name tags based on the calculated group level, and the classified name tags are displayed in different sizes and colors corresponding to the group level.

The display unit 140 displays information related to an operation status of the mobile terminal 100. A Liquid Crystal Display (LCD) may be used in the display unit 140. In this case, the display unit 140 may include an LCD device, an LCD control unit, and a memory device for storing display data. In situations in which the LCD has a touch screen function, the display unit 140 may also be used as an input unit. The display unit 140 displays name tags differently according to the human contact frequency under the control of the control unit 130. The name tag may represent a predetermined group level according to the human contact frequency. For example, if the total number of group levels is 4, the name tags may be displayed in different colors, sizes, and background colors, as shown in Table 2.

TABLE 2

| Group level | Font size | Name tag color | Background | Example |
|---|---|---|---|---|
| Group level 4 | 22 point | White | Green | ABCD |
| Group level 3 | 16 point | Bluish Green | None | ABCD |
| Group level 2 | 12 point | Pale blue | None | ABCD |
| Group level 1 | 9 point | Black | None | ABCD |

The input unit 150 includes alphanumeric keys for character input and function keys for setting various functions. The function keys may include a direction key, side key, and shortcut key for executing a specific function.

Figure 2:
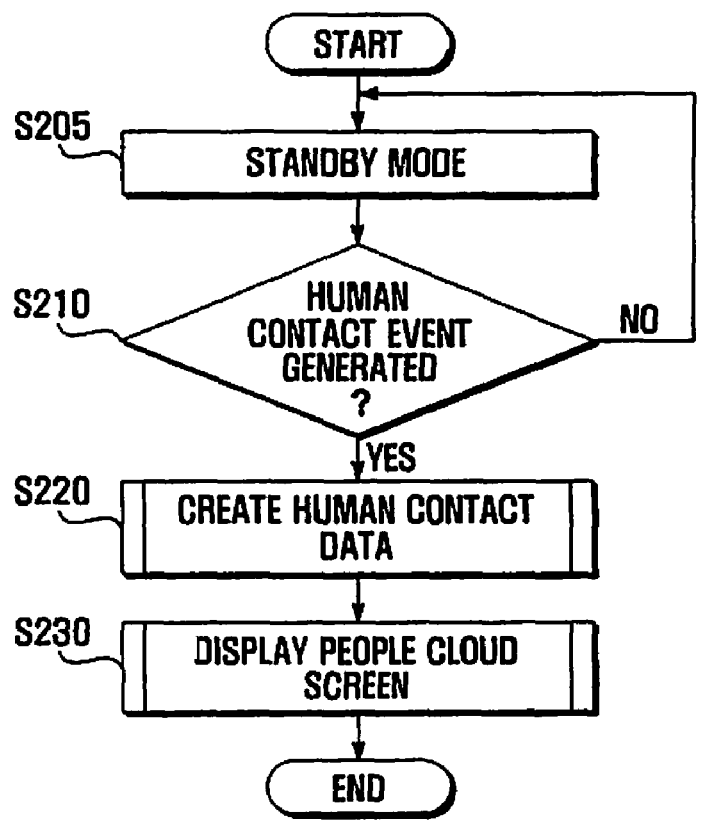
FIG. 2 is a flow chart showing a method of displaying human contact data according to another embodiment of the present invention.

FIG. 2 is a flow chart showing a method of displaying human contact data according to an embodiment of the present invention.

Referring to FIG. 2, if the mobile terminal 100 enters a standby mode displaying a standby screen in step S205, the control unit 130 identifies whether a human contact event is generated in step S210. That is, if a call is received, a message is received, or a user of the mobile terminal transmits a call or a message through the RF communication unit 110, the control unit 130 detects generation of a human contact event. If a human contact event is generated, the control unit 130 creates human contact data by analyzing the human contact event in step S220. The human contact data includes log data corresponding to the human contact event, a name tag corresponding to the log data, and the human contact frequency.

Figure 3:
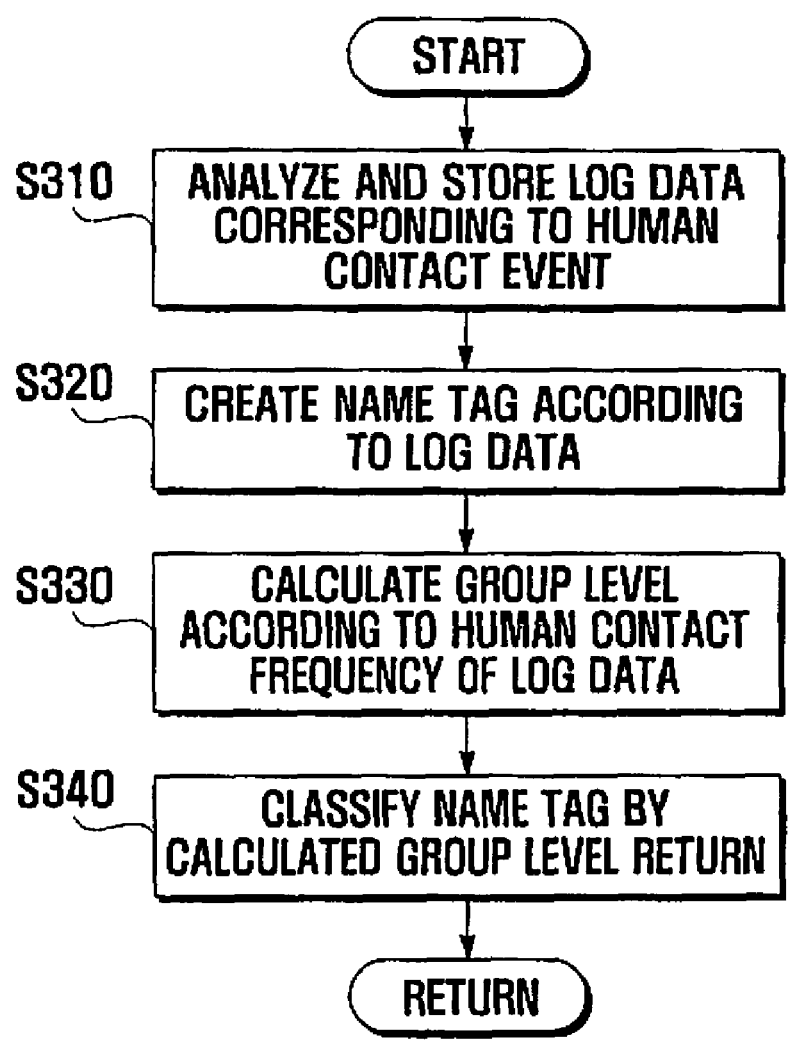
FIG. 3 is a flow chart showing a detailed process of creating human contact data in the method of displaying human contact data of FIG. 2.

FIG. 3 is a flow chart showing a detailed process of step S220 of creating human contact data in the method of displaying human contact data of FIG. 2.

Referring to FIG. 3, if a human contact event is generated, the control unit 130 analyzes log data of the human contact event and stores the log data in the storage unit 120 in step S310. The log data includes a name of a contact person, a telephone number, a type of the human contact event, and a generation time point of the human contact event. The control unit 130 then counts and stores the human contact frequency corresponding to the name of a contact person, as shown in Table 3.

TABLE 3

| Name | Telephone number | Total human contact frequency | Frequency by individual human contact event (transmission/reception) |
|---|---|---|---|
| Name 1 | 010-111-1111 | 20 | Call: 5<br>Short message: 12<br>Multimedia message: 3 |
| Name 2 | 010-222-2222 | 6 | Call: 2<br>Short message: 4<br>Multimedia message: 0 |
| ... | ... | ... | ... |
| Name 9 | 010-999-9999 | 2 | Call: 0<br>Short message: 2<br>Multimedia message: 0 |
| ... | ... | ... | ... |

The control unit 130 creates a name tag by identifying a name of a contact person from the log data analyzed at step S310 in step S320. The name tag may be a name of the contact person or a nickname stored in a telephone book of the mobile terminal 100. The control unit 130 then calculates group levels according to the human contact frequency in step S330. The group levels may be calculated by subtracting the lowest human contact frequency from the highest human contact frequency on the log data list, and dividing the difference by a predetermined number of group levels. The number of group levels may be set at a production process of the mobile terminal, or by a user in a display setting of a people cloud screen. For example, in a case where the highest human contact frequency is 20, the lowest human contact frequency is 2, and the predetermined number of group levels for displaying a name tag is 4, the difference between the human contact frequencies is 18 (20−2) and the range of a group level becomes 4.5 (18÷4), as shown in Table 4.

TABLE 4

| Group level | Range (R) of group level |
|---|---|
| Group level 1 | 2 ≦ R ≦ 6.5 |
| Group level 2 | 6.5 < R ≦ 11 |
| Group level 3 | 11 < R ≦ 15.5 |
| Group level 4 | 15.5 < R ≦ 20 |

Alternatively, the group level may be set by the user without a calculating process. For example, the range of group level 1 may be set to 'less than or equal to 10', the range of group level 2 may be set to 'more than 10 and less than or equal to 25', and so on.

The control unit 130 classifies the name tags according to the calculated group levels in step S340. The control unit 130 identifies the total human contact frequency corresponding to the name tag and determines the group level of the name tag. For example, referring to Table 3, the total human contact frequency of Name 1 is 20, and the control unit 130 compares this value with each range of the group levels shown in Table 4 and determines the group level of Name 1 as 'Group level 4'. When the classification of the name tag is complete, the process continues at step S230 of FIG. 2.

The control unit 130 displays a people cloud screen including a name tag in the display unit 140 in step S230.

Figure 4:
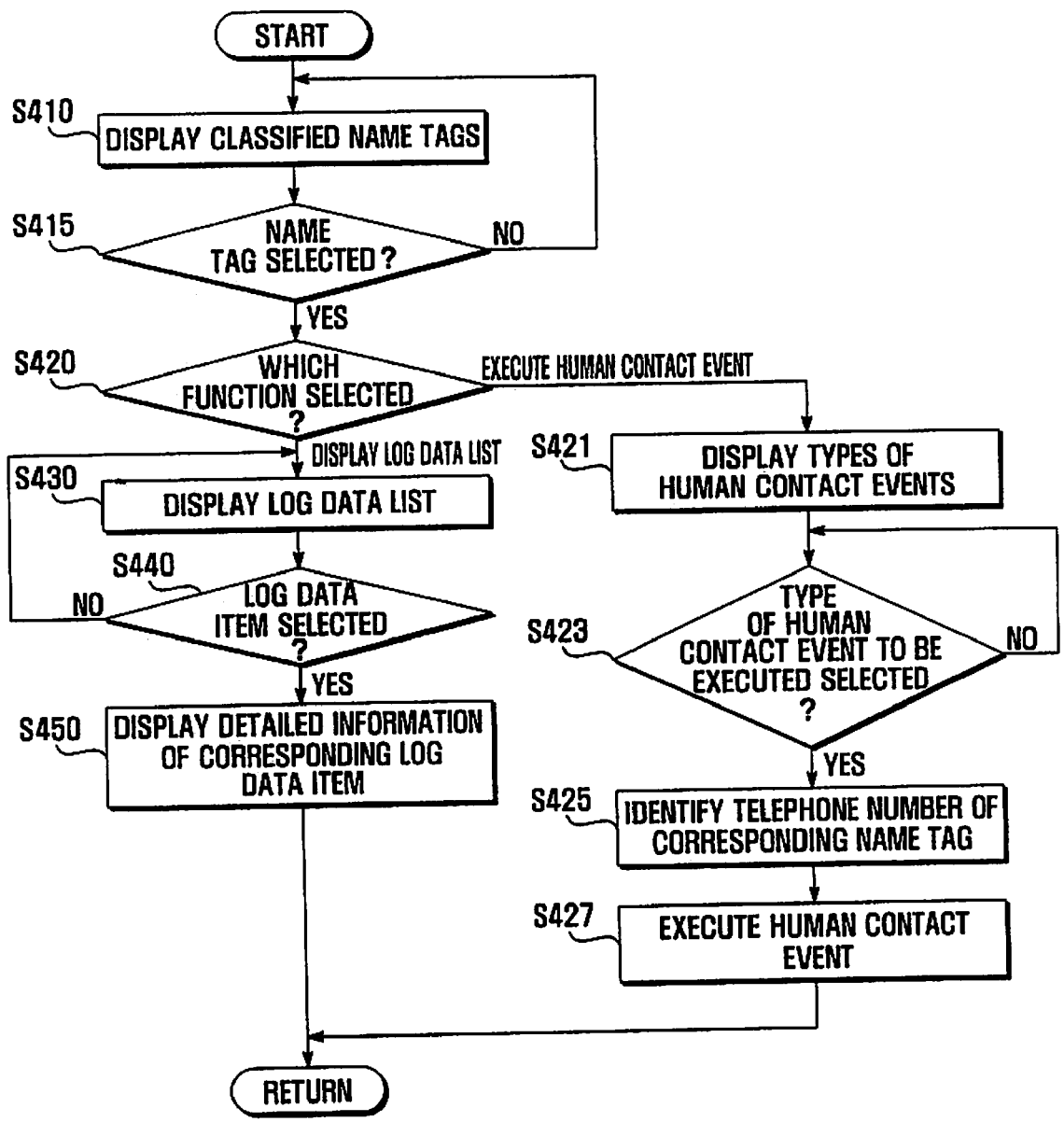
FIG. 4 is a flow chart showing a detailed process of displaying a people cloud screen in the method of displaying human contact data of FIG. 2.
Figure 5A:
FIGS. 5A to 5C are screen examples showing a people cloud screen displayed in the method of displaying human contact data of FIG. 2.
Figure 5B:
Figure 5C:
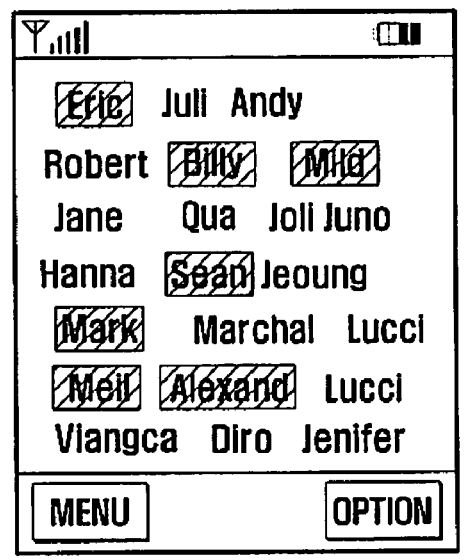
Figure 6A:
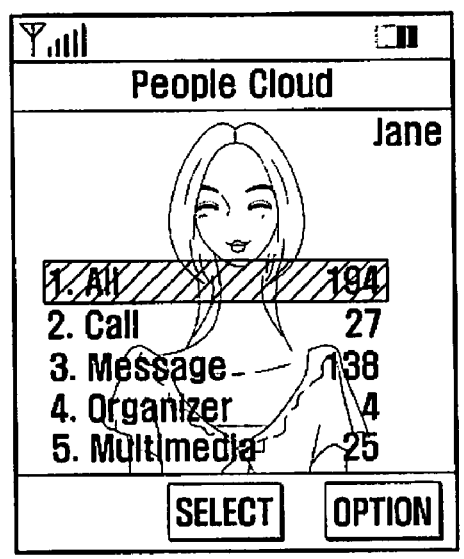
FIGS. 6A to 6C are screen examples showing steps of identifying detailed information by selecting a name tag in the method of displaying human contact data of FIG. 2.
Figure 6B:
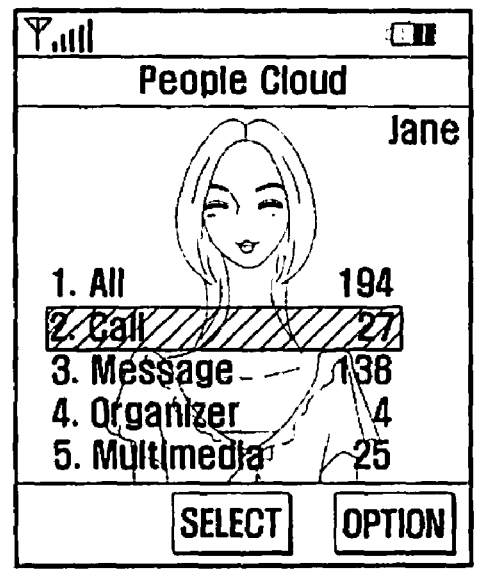
Figure 6C:
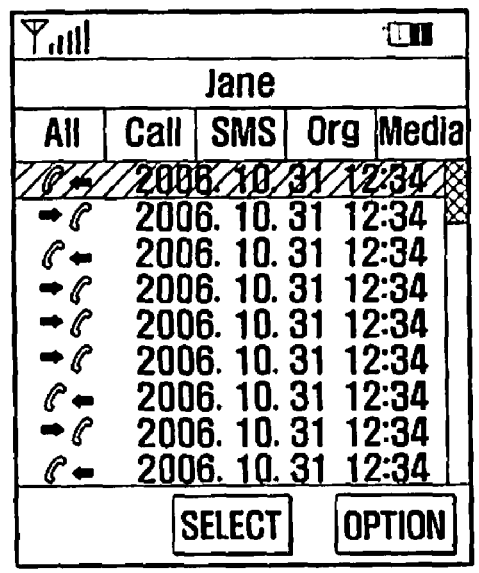

FIG. 4 is a flow chart showing a detailed process of step S230 of displaying a people cloud screen in the method of displaying human contact data of FIG. 2. FIGS. 5A to 5C are views of display screens showing a people cloud screen displayed in the method of displaying human contact data of FIG. 2. FIGS. 6A to 6C are views of display screens showing steps of identifying detailed information by selecting a name tag in the method of displaying human contact data of FIG. 2.

Referring to FIG. 4, the control unit 130 controls the display unit 140 to display name tags in step S410, as shown in FIGS. 5A to 5C. The order of displaying name tags may be set by the user, as shown in the display screens of FIGS. 5A to 5C. According to the user setting, the name tags may be displayed in alphabetical order as shown in FIG. 5A, in order of human contact frequency as shown in FIG. 5B, or in order of event generation time point as shown in FIG. 5C. The order of displaying name tags is determined by selecting a display method from a menu or by inputting a specific key.

The control unit 130 then identifies whether a name tag is selected from the displayed name tags in step S415. If a name tag is selected from the displayed name tags, the control unit 130 identifies whether an executable function is assigned to the selected name tag. The executable function may be a function of displaying a log data list of the selected name tag or of executing a human contact event corresponding to the selected name tag. The control unit 130 determines which one of the executable functions is selected by the user in step S420.

If the function of executing a human contact event is selected, the control unit 130 controls the display unit 140 to display the types of human contact events in a pop-up window in step S421. The type of human contact events displayed in the pop-up window may be call transmission, short message transmission, multimedia message transmission, or deletion of the corresponding name tag.

The control unit 130 identifies whether a type of human contact event to be executed is selected in step S423. If a type of human contact event to be executed is selected through the input unit 150, the control unit 130 identifies a telephone number corresponding to the selected name tag in step S425, and executes the selected human contact event in step S427. For example, if call transmission is selected as the human contact event to be executed, the control unit 130 dials the identified telephone number and transmits a call through the RF communication unit 110. If message transmission is selected as the human contact event to be executed, the control unit 130 identifies a telephone number corresponding to the selected name tag and controls the display unit 140 to display an input window for preparing a message. When the user completes preparing a message and inputs a command for transmitting the message through the input unit 150, the control unit 130 transmits the input message to the identified telephone number.

If the function of displaying a log data list is selected at step S420, the control unit 130 controls the display unit 140 to display a stored log data list of the selected name tag in step S430, as shown in FIG. 6A. For example, if the user selects a name tag 'Jane' from the displayed tag names at step S415, upon selecting the function of displaying a log data list, the control unit 130 controls the display unit 140 to display a log data list corresponding to the name tag 'Jane'. The control unit 130 may display a photograph corresponding to the selected name tag as a background image. The log data list may include the total human contact frequency and the frequencies of individual human contact events. The log data list may further include the number of data files containing a contact person name corresponding to the name tag. The data file may be a music file, a voice file, a memo file, a photograph or an image file containing the contact person name, stored in the mobile terminal 100.

The control unit 130 identifies whether a log data item is selected from the log data list in step S440. If the user selects a log data item from the log data list (for example, '2. Call' of FIG. 6B), the control unit 130 controls the display unit 140 to display log data corresponding to the selected log data item in step S450, as shown in FIG. 6C. Here, the log data includes a type of a call, and date and time of call transmission or call reception. When displaying log data of the corresponding log data item, the control unit 130 displays each log data item in a tabular format. Therefore, when log data of a selected log data item is displayed in a screen, the user may select another log data item.

In this specification, a people cloud screen has been described as an example of displaying data in a standby screen of the mobile terminal 100. However, the people cloud screen may further display the quantities of data, such as a photograph, music, memo, and schedule data, stored by individual contact persons in the mobile terminal 100, in addition to data generated during communication with the mobile terminal 100. The people cloud screen may further display accumulated log data by selecting an optional function from a menu. The people cloud screen may be set to be displayed in the display unit 140 when a function of displaying a people cloud screen is selected from a menu.

When a name tag is selected from the people cloud screen, the control unit 130 may display statistical information for a predetermined period corresponding to the selected name tag. For example, the control unit 130 may display statistical information of how often a person has been contacted and how much data exists that is related to the contact person.

Name tags for other types of data (for example, moving picture and photograph) stored in the mobile terminal 100 may be input through the people cloud screen. For example, if the user inputs a command for assigning a name tag to a photograph, the control unit 130 controls the display unit 140 to display a people cloud screen. If the user selects a tag from the people cloud screen, the control unit 130 assigns the selected name tag to a photograph selected by the user.

According to the present invention, a user may identify a human contact frequency by using log data of a mobile terminal. That is, the user may easily identify the most frequently contacted person and the least frequently contacted person for a predetermined period by using the log data.

The log data is displayed in a user-oriented method instead of a function-related display method, and thereby the user may easily identify log data and the human contact frequency for each contact person.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of displaying human contact data in a mobile terminal, comprising the steps of:
   creating a name tag, when a human contact event is generated, by analyzing log data corresponding to the human contact event;
   calculating at least one group level from the log data according to human contact frequency of a corresponding human contact event;
   determining the group level of the created name tag based on the human contact frequency corresponding to the created name tag; and
   displaying the created name tag according to the determined group level in a standby screen, wherein characters of the name tag are displayed in a manner corresponding to their calculated group level, visually distinguishable from name tags corresponding to other group levels,
   wherein calculating the group level comprises calculating a range of each group level by subtracting a lowest human contact frequency from a highest human contact frequency on a log data list, and dividing the difference by a predetermined number of group levels.

2. The method of claim 1, wherein calculating the at least one group level further comprises setting a range of each group level to determine a display manner of the name tag according to the human contact frequency.

3. The method of claim 1, wherein the name tag is displayed using a font color, font size, and background color set according to a human contact frequency of the corresponding human contact event.

4. The method of claim 1, wherein displaying the name tag comprises:
   arranging the classified name tags on the standby screen;
   displaying a log data list corresponding to a selected name tag, when the name tag is selected from the arranged name tags; and
   displaying detailed information corresponding to a selected log data, when the log data is selected from the log data list.

5. The method of claim 4, further comprising executing a human contact event corresponding to a selected name tag, when a name tag is selected from the arranged name tags and a specific input key for executing the human contact event is input.

6. The method of claim 4, wherein the human contact event is at least one of call reception, call transmission, message transmission, and message reception.

7. The method of claim 4, wherein the log data comprises at least one of a name of a contact person, a telephone number, a type of human contact event, a generation time point of the human contact event, and a human contact frequency of the human contact event.

8. The method of claim 4, wherein the log data list comprises at least one of a total frequency of communication with a contact person, frequencies of communication according to a type of human contact event, and a data file corresponding to individual contact persons.

9. The method of claim 4, wherein displaying the log data list further comprises displaying a photograph or an image corresponding to the name tag.

10. A mobile terminal comprising:
a control unit for creating human contact data corresponding to a human contact event, a name tag corresponding to the created human contact data, when the human contact event is generated, calculating at least one group level from log data according to human contact frequency of a corresponding human contact event and determining the group level of the name tag based on the human contact frequency corresponding to the name tag;
a storage unit for storing the human contact data and the name tag created by the control unit; and
a display unit for displaying the name tag created by the control unit, according to the determined group level, wherein name tag characters are displayed in a manner corresponding to their calculated group level, visually distinguishable from name tags corresponding to other group levels,
wherein calculating the group level comprises calculating a range of each group level by subtracting a lowest human contact frequency from a highest human contact frequency on a log data list, and dividing the difference by a predetermined number of group levels.

11. The mobile terminal of claim 10, wherein the storage unit further stores name tag display data and the log data.

12. The mobile terminal of claim 11, wherein the name tag display data comprises at least one of a font color, a font size, and a background color for the name tag corresponding to the group level.

13. The method of claim 4, wherein arranging the name tags comprises:
arranging the name tags in order of their group level.

14. The method of claim 4, wherein arranging the name tags comprises:
arranging the name tags in order of human contact frequency within the group level.

15. The mobile terminal of claim 10, wherein calculating the group level further comprises setting a range of each group level, to determine a display manner of the name tag according to the human contact frequency.

* * * * *